(12) United States Patent
Das et al.

(10) Patent No.: US 8,185,812 B2
(45) Date of Patent: May 22, 2012

(54) SINGLE EVENT UPSET ERROR DETECTION WITHIN AN INTEGRATED CIRCUIT

(75) Inventors: Shidhartha Das, Ann Arbor, MI (US); David Theodore Blaauw, Ann Arbor, MI (US); David Michael Bull, Balsham (GB)

(73) Assignees: ARM Limited, Cambridge (GB); The Regents of the University of Michigan, Ann Arbor, MI (US)

( * ) Notice: Subject to any disclaimer, the term of this patent is extended or adjusted under 35 U.S.C. 154(b) by 1035 days.

(21) Appl. No.: 11/636,716

(22) Filed: Dec. 11, 2006

(65) Prior Publication Data
US 2007/0162798 A1 Jul. 12, 2007

Related U.S. Application Data

(63) Continuation-in-part of application No. 11/110,961, filed on Apr. 21, 2005, now Pat. No. 7,320,091, which is a continuation-in-part of application No. 10/779,805, filed on Feb. 18, 2004, now Pat. No. 7,162,661, which is a continuation-in-part of application No. 10/392,382, filed on Mar. 20, 2003, now Pat. No. 7,278,080.

(60) Provisional application No. 60/760,399, filed on Jan. 20, 2006.

(51) Int. Cl.
*G06F 11/00* (2006.01)
(52) U.S. Cl. ..................... 714/814
(58) Field of Classification Search .................. 714/814
See application file for complete search history.

(56) References Cited

U.S. PATENT DOCUMENTS

| | | | |
|---|---|---|---|
| 3,893,070 A | 7/1975 | Bossen et al. |
| 3,905,023 A | 9/1975 | Perpiglia |
| 4,227,175 A | 10/1980 | Newman |
| 4,339,657 A | 7/1982 | Larson et al. |
| 4,558,379 A | 12/1985 | Hutter et al. |
| 4,633,465 A | 12/1986 | Fitch et al. |
| 4,635,223 A | 1/1987 | Boone et al. |
| 4,669,092 A | 5/1987 | Sari et al. |
| 4,756,005 A | 7/1988 | Shedd |
| 4,833,635 A | 5/1989 | McCanny et al. |
| 4,885,715 A | 12/1989 | McCanny et al. |
| 4,918,709 A | 4/1990 | Fitch |
| 4,975,930 A | 12/1990 | Shaw |

(Continued)

FOREIGN PATENT DOCUMENTS
EP 0 366 331 5/1990
(Continued)

OTHER PUBLICATIONS

"ARM710 Data Sheet" Dec. 1994, Advanced RISC Machines Ltd. (ARM).

(Continued)

*Primary Examiner* — Stephen Baker
(74) *Attorney, Agent, or Firm* — Nixon & Vanderhye P.C.

(57) ABSTRACT

An integrated circuit 2 includes logic circuitry 10 and sequential storage elements 8. Both the logic circuit 10 and sequential storage elements 8 can be subject to particle strikes giving rise to single event upset errors. These single event upset errors can be detected by detecting a transition in the stored value stored by the sequential storage elements 8 occurring outside of a valid transition period associated with that sequential storage element 8.

31 Claims, 7 Drawing Sheets

U.S. PATENT DOCUMENTS

| | | | |
|---|---|---|---|
| 5,043,990 A | 8/1991 | Doi et al. |
| 5,203,003 A | 4/1993 | Donner |
| 5,276,690 A | 1/1994 | Lee et al. |
| 5,291,496 A | 3/1994 | Andaleon et al. |
| 5,313,625 A | 5/1994 | Hess et al. |
| 5,321,705 A | 6/1994 | Gould et al. |
| 5,400,370 A | 3/1995 | Guo |
| 5,402,273 A | 3/1995 | Tucker |
| 5,408,200 A | 4/1995 | Buhler |
| 5,414,722 A | 5/1995 | Tollum |
| 5,426,746 A | 6/1995 | Sekiguchi |
| 5,455,536 A | 10/1995 | Kono et al. |
| 5,463,351 A | 10/1995 | Marko et al. |
| 5,504,859 A | 4/1996 | Gustafson et al. |
| 5,509,076 A | 4/1996 | Sprunk |
| 5,528,637 A | 6/1996 | Sevenhans et al. |
| 5,553,232 A | 9/1996 | Wilhite et al. |
| 5,572,662 A | 11/1996 | Ohta et al. |
| 5,615,263 A | 3/1997 | Takahashi |
| 5,625,652 A | 4/1997 | Petranovich |
| 5,627,412 A | 5/1997 | Beard |
| 5,630,154 A | 5/1997 | Bolstad et al. |
| 5,737,369 A | 4/1998 | Retzer |
| 5,859,551 A | 1/1999 | Ohishi et al. |
| 5,862,141 A | 1/1999 | Trotter |
| 5,870,446 A | 2/1999 | McMahan et al. |
| 5,872,907 A | 2/1999 | Griess et al. |
| 5,896,391 A | 4/1999 | Solheim et al. |
| 5,914,903 A | 6/1999 | Kanma et al. |
| 6,067,256 A | 5/2000 | Yamashita et al. |
| 6,076,175 A | 6/2000 | Drost et al. |
| 6,078,627 A * | 6/2000 | Crayford ............ 375/286 |
| 6,114,880 A | 9/2000 | Buer et al. |
| 6,127,864 A | 10/2000 | Mavis et al. |
| 6,148,423 A | 11/2000 | Le Mouel et al. |
| 6,167,526 A | 12/2000 | Carlson |
| 6,173,423 B1 | 1/2001 | Autechaud et al. |
| 6,188,610 B1 | 2/2001 | Kakizoe et al. |
| 6,222,660 B1 | 4/2001 | Traa |
| 6,282,661 B1 | 8/2001 | Nicol |
| 6,453,431 B1 | 9/2002 | Bernstein et al. |
| 6,476,643 B2 | 11/2002 | Hugues et al. |
| 6,523,201 B1 | 2/2003 | De Michele |
| 6,650,661 B1 * | 11/2003 | Buchanan et al. ............ 370/516 |
| 6,693,985 B2 | 2/2004 | Li et al. |
| 6,741,110 B2 | 5/2004 | Roisen |
| 6,772,388 B2 | 8/2004 | Cooper et al. |
| 6,799,292 B2 | 9/2004 | Takeoka et al. |
| 6,831,496 B2 | 12/2004 | Gardner |
| 6,834,367 B2 | 12/2004 | Bonneau et al. |
| 6,907,553 B2 | 6/2005 | Popplewell et al. |
| 6,931,565 B2 | 8/2005 | Hirabayashi |
| 6,944,468 B2 | 9/2005 | Okumura |
| 6,958,627 B2 | 10/2005 | Singh et al. |
| 6,977,910 B1 | 12/2005 | Hosur et al. |
| 6,985,547 B2 | 1/2006 | Uht |
| 7,002,358 B2 * | 2/2006 | Wyatt ............ 324/622 |
| 7,010,074 B2 | 3/2006 | Nakamura |
| 7,023,235 B2 | 4/2006 | Hoff |
| 7,046,056 B2 | 5/2006 | Kizer et al. |
| 7,061,294 B1 * | 6/2006 | Talledo et al. ............ 327/291 |
| 7,073,080 B2 | 7/2006 | Lou |
| 7,085,993 B2 | 8/2006 | Goodnow et al. |
| 7,096,137 B2 | 8/2006 | Shipton et al. |
| 7,096,402 B2 | 8/2006 | Yano et al. |
| 7,116,744 B2 | 10/2006 | Saze et al. |
| 7,142,623 B2 | 11/2006 | Sorna |
| 7,162,661 B2 | 1/2007 | Mudge et al. |
| 7,188,284 B2 | 3/2007 | Mitra et al. |
| 7,236,555 B2 * | 6/2007 | Brewer ............ 375/357 |
| 7,257,173 B2 * | 8/2007 | Wood et al. ............ 375/342 |
| 7,260,742 B2 | 8/2007 | Czajkowski |
| 7,278,074 B2 | 10/2007 | Mitra et al. |
| 7,278,076 B2 | 10/2007 | Zhang et al. |
| 7,278,080 B2 | 10/2007 | Flautner et al. |
| 7,310,755 B2 | 12/2007 | Mudge et al. |
| 7,320,091 B2 | 1/2008 | Blaauw et al. |
| 7,323,946 B2 * | 1/2008 | Seefeldt et al. ............ 331/25 |
| 7,337,356 B2 | 2/2008 | Mudge et al. |
| 7,401,273 B2 | 7/2008 | Lee et al. |
| 7,482,831 B2 | 1/2009 | Chakraborty et al. |
| 7,546,519 B2 | 6/2009 | Agarwal |
| 7,594,150 B2 | 9/2009 | Chakraborty et al. |
| 7,650,551 B2 | 1/2010 | Flautner et al. |
| 7,671,627 B1 | 3/2010 | Somani et al. |
| 7,782,125 B2 | 8/2010 | Shimura |
| 7,797,575 B2 | 9/2010 | Clark et al. |
| 2001/0016927 A1 | 8/2001 | Poisner |
| 2002/0038418 A1 | 3/2002 | Shimamura |
| 2004/0130351 A1 | 7/2004 | Hazucha et al. |
| 2004/0199821 A1 | 10/2004 | Flautner et al. |
| 2005/0162185 A1 | 7/2005 | Satsukawa |
| 2007/0028157 A1 | 2/2007 | Drake et al. |
| 2010/0088565 A1 | 4/2010 | Chandra |
| 2011/0126051 A1 | 5/2011 | Flautner et al. |

FOREIGN PATENT DOCUMENTS

| | | |
|---|---|---|
| EP | 0 374 420 | 6/1990 |
| EP | 0 653 708 | 5/1995 |
| JP | 60-20398 | 2/1985 |
| JP | 62-24498 | 2/1987 |
| JP | 2001-175542 | 6/2001 |
| SU | 809350 | 2/1981 |
| WO | WO 00/54410 | 9/2000 |
| WO | WO 01/46800 | 6/2001 |
| WO | WO 2004/084072 | 9/2004 |

OTHER PUBLICATIONS

F. Worm et al, "An Adaptive Low-Power Transmission Scheme for On-Chip Networks" *ISSS*'02, Oct. 2002, pp. 92-100.

Enomoto et al, "A low-power, high speed 0.25 μm GaAs D-FF" Proceedings of the $23^{rd}$ European Solid-State Circuits Conference, 1997, ESSCIRC '97, Sep. 16-18, 1997, pp. 300-303.

N. Kanekawa et al, "Fault Detection and Recovery Coverage Improvement by Clock Synchronized Suplicated Systems with Optimal Time Diversity" *Fault-Tolerant Computing*, Jun. 1998, pp. 196-200.

U.S. Appl. No. 12/078,189, filed Mar. 27, 2008, Chandra et al.
U.S. Appl. No. 12/285,517, filed Oct. 7, 2008, Chandra.
U.S. Appl. No. 12/461,740, filed Aug. 21, 2009, Blaauw et al.
U.S. Appl. No. 12/923,911, filed Oct. 13, 2010, Flautner et al.
U.S. Appl. No. 12/923,908, filed Oct. 13, 2010, Flautner et al.
U.S. Appl. No. 12/926,084, filed Oct. 25, 2010, Flautner et al.
U.S. Appl. No. 13/064,207, filed Mar. 10, 2011, Choudhury et al.

Office Action mailed Aug. 3, 2011 in co-pending U.S. Appl. No. 12/923,911.

Office Action mailed Aug. 29, 2011 in co-pending U.S. Appl. No. 12/078,189.

S. Mitra et al, "Logic Soft Errors in Sub-65nm Technologies Design and CAD Challenges" *DAC 2005*, Jun. 2005, pp. 2-4.

P. Hazucha et al, "Measurements and Analysis of SER-Tolerant Latch in a 90-nm Dual-$V_T$ CMOS Process" *IEEE Journal of Solid-State Circuits*, vol. 39, No. 9, Sep. 2004, pp. 1536-1543.

S. Mitra et al, "Robust System Design with Built-In Soft-Error Resilience" IEEE Computer Society Feb. 2005, pp. 43-52.

M. Keating et al, "Low Power Methodology Manual for System-on-Chip Design" p. 216.

M. Zhang et al, "Sequential Element Design With Built-In Soft Error Resilience" *IEEE Transactions on Very Large Scale Integration(VLSI) Systems*, vol. 14, No. 12, Dec. 2006, pp. 1368-1378.

A.J. Drake et al, "A Self-Correcting Soft Error Tolerant Flop-Flop" $12^{th}$ NASA Symposium on VLSI Design, Oct. 2005.

V. Chandra et al, "Impact of Technology and Voltage Scaling on the Soft Error Susceptibility in Nanoscale CMOS" *DFTVS* '08, IEEE International Symposium on Defect and Fault Tolerances of VLSI Systems, 2008.

Hill et al. "An Accurate Flip-Flop Selection Technique for Reducing Logic SER", *Dept. of Electrical and Computer Engineering—Univ. of Wisconsin*, No Date, pp. 1-9.

Rockett, "An SEU-Hardened CMOS Data Latch Design", *IEEE Transactions on Nuclear Sciences*, vol. 35, No. 6, Dec. 1998, pp. 1682-1687.

Karnik et al., "Characterization of Soft Errors Caused by Single Event Upsets in CMOS Processes", *IEEE Transactions on Dependable and Secure Computing*, vol. 1, No. 2, Apr. 2004, pp. 128-143.

Li et al., "Low Power Dissipation SEU-hardened CMOS Latch", *PIERS Online*, vol. 3, No. 7, 2007, pp. 1080-1084.

Dabiri et al., "Soft Error-Aware Power Optimization using Gate Sizing", *Computer Science Dept.—Univ. of California*, No Date, pp. 1-10.

Zhang et al., "Design for Resilience to Soft Errors and Variations", *IEEE Computer Society*, 2007, 6 pages.

Huang et al., "A New Radiation Hardened by Design Latch for Ultra-Deep-Sub-Micron Technologies", *IEEE Computer Society*, 2008, pp. 175-176.

Das et al., "RazorII: In Situ Error Detection and Correction for PVT and SER Tolerance", *IEEE Journal of Solid-State Circuits*, vol. 44, No. 1, Jan. 2009, pp. 32-48.

Jagirdar et al., "A Robust Architecture for Flip-Flops Tolerant to Soft-Errors and Transients from Combinational Circuits", *IEEE Computer Society*, 2008, pp. 39-44.

Calin et al., "Upset Hardened Memory Design for Submicron CMOS Technology", *IEEE Transactions on Nuclear Science*, vol. 43, No. 6, Dec. 1996, pp. 2874-2878.

Naseer et al., "DF-DICE: A Scalable Solution for Soft Error Tolerant Circuit Design", *ISCAS* 2006, pp. 3890-3893.

Jargirdar et al., "Efficient Flip-Flop Designs for SET/SEU Mitigation with Tolerance to Crosstalk Induced Signal Delays", *Rutgers University*, 24 pages.

Giacomotto et al., "Energy Efficiency of Power-Gating in Low-Power Clocked Storage Elements", *PATMOS Proceedings*, No Date, 9 pages.

Goel et al, "Low-Overhead Design of Soft-Error-Tolerant Scan Flip-Flops with Enhanced-Scan Capability", *IEEE*, 2006, pp. 665-670.

S. Das, "Razor: A Variability-Tolerant Design Methodology for Low-Power and Robust Computing", *Computer Science and Engineering—Univ. of Michigan*, 2009, pp. 1-122.

K. Seshadri, "Reduction of Architecture Vulnerability Factor using Modified Razor Flip-flops", *Dept. of Electrical and Computer Engineering*—Univ. of Maryland, 2007, pp. 1-61.

Calin et al, "Upset-Tolerant CMOS SRAM Using Current Monitoring: Prototype and Test Experiments", *International Test Conference IEEE* 1995, pp. 45-53.

A. Venkatraman et al, "A Robust, Fast Pulsed Flip-Flip Design" *GLSVLSI'08*, May 2008, pp. 119-122.

S. Mitra et al, "Built-In Soft Error Resilience for Robust System Design" IEEE, 2007, pp. 1-6.

S. Mitra "Built-In Soft Error Resilience for Robust System Design" power point presentation pp. 1-34 & 36-45 www.ewh.ieee.org/r6/scv/r1/articles/ser.talk.grid.v1.pdf.

Notice of Allowance mailed Dec. 16, 2011 in co-pending U.S. Appl. No. 12/285,517.

A. Goel et al, "Low-Overhead Design of Soft-Error-Tolerant Scan Flip-Flops with Enhanced-Scan Capability" Design Automation, 2006, Asia and South Pacific Conference, Jan. 2006, pp. 665-670.

R. Oliveira et al, "A TMR Scheme for SEU Mitigation in Scan Flip-Flops" Proceedings of the 8th International Symposium on Quality Electronic Design (ISQED'07), Mar. 2007, pp. 905-910.

M. Zhang et al, "Sequential Element Design With Built-In Soft Error Resilience" IEEE Transactions on Very Large Scale Integration (VLSI) Systems, vol. 14, No. 12, Dec. 2006, pp. 1368-1378.

S.V. Devarapalli et al, "SEU-hardened Dual Data Rate Flip-Flop Using C-elements" 2010 IEEE 25th International Symposium on Defect and Fault Tolerance in VLSI Systems, Oct. 2010, pp. 167-171.

\* cited by examiner

(b) *Read from ECC memory*

(a) *Write to ECC memory*

Fig. 9

Prior Art

SINGLE EVENT UPSET ERROR DETECTION WITHIN AN INTEGRATED CIRCUIT

This application claims the benefit of U.S. Provisional Application No. 60/760,399 filed 20 Jan. 2006 and is a continuation-in-part of U.S. Ser. No. 11/110,961, filed 21 Apr. 2005 now U.S. Pat. No. 7,320,091, which is a continuation-in-part of U.S. Ser. No. 10/779,805, filed 18 Feb. 2004 and issued 9 Jan. 2007 as U.S. Pat. No. 7,162,661 and which in turn was a continuation-in-part of U.S. Ser. No. 10/392,382, filed 20 Mar. 2003 now U.S. Pat. No. 7,278,080, the entire contents of each of which are hereby incorporated by reference in this application.

BACKGROUND OF THE INVENTION

1. Field of the Invention

This invention relates to the field of integrated circuits. More particularly, this invention relates to the detection of single event upset errors within integrated circuits, such as those which arise from alpha particle strikes.

2. Description of the Prior Art

A Single Event Upset (SEU) is a change in state or a transient voltage pulse at sensitive nodes in integrated circuits, such as processors. Single Event Upsets occur due to high energy particle strikes on the silicon substrate of processors. Errors can occur due to SEU if it leads to a state flip in the sequential storage elements that determine the architectural state of the processor, such as the RAM arrays, the Register File and the architectural-state registers. In the context of this document, we consider an error due to SEU as a state flip in any state-holding element inside the processor.

Figure 9:
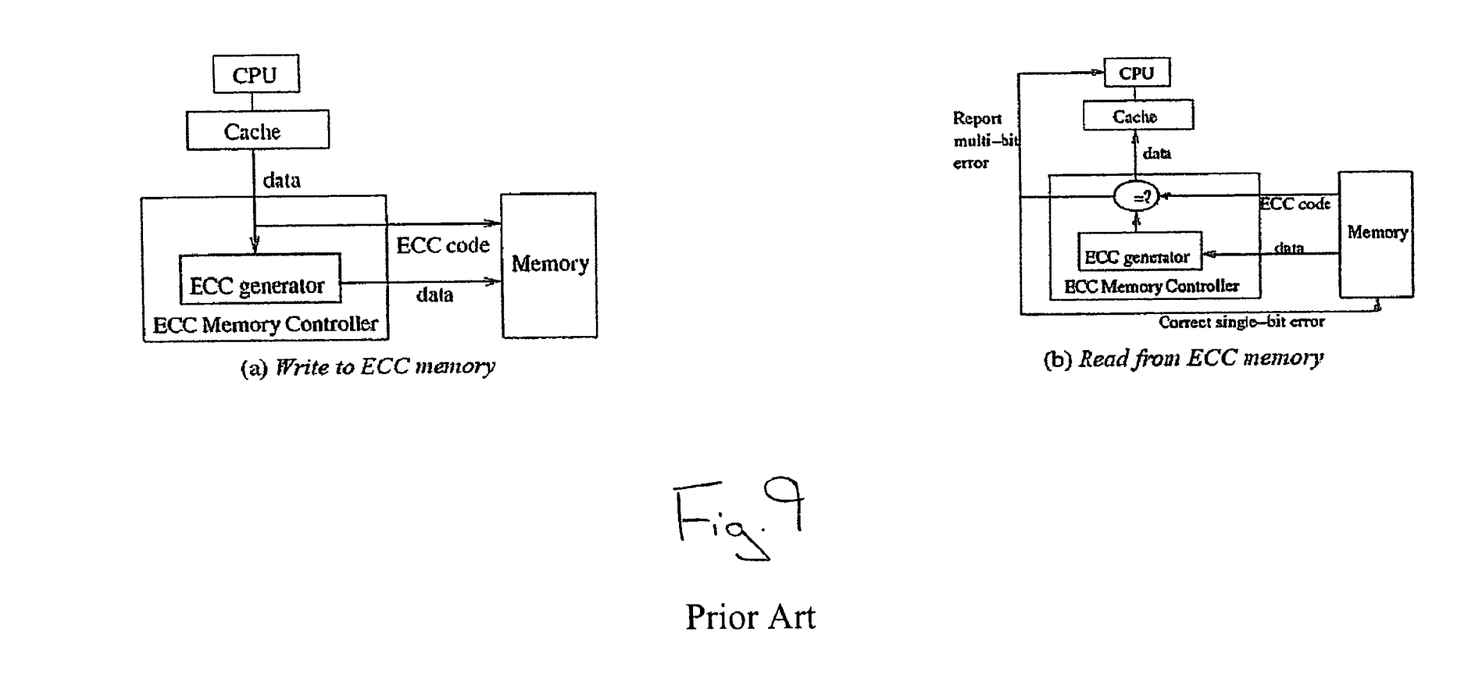

The traditional technique of protection of RAM arrays and architectural state registers against particle strikes on their state holding nodes is through the use of Error Correcting Codes, or ECC. The conceptual representation of how ECC works is shown in FIGS. 9(a) and 9(b) of the accompanying drawings in the context of RAM arrays. The ECC block implements a standard algorithm on the block of data to be written in order to generate a, so-called, "code". The code corresponding to the input data and the data itself are then both written into the memory. During a read operation, both the data and its code are read out. The ECC block then recomputes the code for the data and compares that to the code already read out. If the "recomputed" code does not match with the "read" code, then it is indicative of a state flip inside the RAM array. Such an event is flagged as an error.

With standard ECC algorithms, it is possible to correct an erroneous block of data, albeit with additional computational and storage overhead. If the error occurs in only a single bit of the data, then the overhead of correction using ECC is reasonable. However, the ability to detect and correct errors in multiple bits requires fairly sophisticated ECC algorithms with prohibitive computational and storage overhead. Hence, the typical practice is to use ECC for double-bit error detection and single-bit error correction.

Since Single Event Upsets inside memories typically cause single bit flips, ECC is a very effective error detection and correction technique for memory protection. For Single Event Upsets inside registers, another popular technique is the use of alternative flip-flop architectures that are designed for SEU robustness. The main concept in these known designs is to reduce the likelihood of state corruption in latching elements by one of increasing the overall capacitance on the latching node so as to decrease the likelihood of a state flip (the charge required to upset the state will be more with increased capacitance); overdriving the latching nodes through active devices to fight against state flips; and providing for redundancy in the latching elements and additional voting circuitry to choose between their outputs. These known circuit-based techniques for SEU robustness require duplication or triplication of state-holding elements within a flip-flop in order to reduce the likelihood of an error occurring due to an SEU. These known techniques disadvantageously increase the amount of circuit area needed and the power consumed.

All the techniques described above (ECC and the robust flip-flops) are designed for protection against particle strikes on the state-holding nodes of the processor. They are ineffective against particle strikes on combinatorial logic feeding into storage elements. Typically, particle strikes on combinatorial logic leads to a transient pulse on the incident node that can be captured at multiple storage elements in its fan-out, thereby corrupting their state.

A known technique for protecting the processor core against particle strikes on the combinatorial logic, and/or pipeline registers, is to duplicate the core and vote between the replicas. Thus, the identical processor cores run in lock-step and an error is flagged when their outputs disagree. However, this technique incurs significant power and area overhead (both area and power consumption are typically, at least doubled). There is also the added difficultly of suitably protecting the voting circuit.

Also known within the field of integrated circuits are the design techniques described in US Published Patent Application 2004-0199821 (the content of this published patent application is incorporated herein in its entirety by reference). The techniques described in this published patent application are sometimes referred to "Razor" and correspond to a design technique that allows voltage safety margins providing for uncertainties in silicon and ambient conditions to be eliminated or reduced. As a consequence, it is possible that timing violations can occur due to a combination of worst-case voltage, and temperature conditions. Razor provides a relatively low overhead detection and recovery mechanism to suitably flag the rare worst-case timing errors and recover correct state. In general, the Razor technique involves adjusting the operating parameters of an integrated circuit, such as the clock frequency, the operating voltage, the body bias voltage, temperature and the like so as to maintain a finite non-zero error rate in a manner that increases overall performance. Errors are detected in the processing stages by comparison of a non-delayed data value with a delayed data value. These data values are captured at slightly different times.

Figure 8:
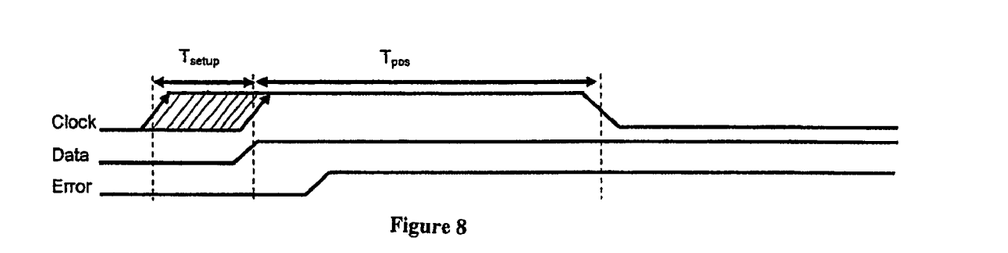
FIG. 8 is a timing diagram illustrating timing within a Razor-like system.

One mechanism for implementing the above described techniques is described in US Published Patent No. 2005/246613 the content of which is incorporated herein in its entirety by reference). This patent application describes a transition detecting flip-flop that can be used to detect timing errors when employing Razor techniques. Timing errors occur in a Razor-like system when propagation delay through combinatorial logic causes the data input to an edge-triggered sequential element, such as a flip-flop, to violate setup requirements. Data may change state in the setup or the hold window causing metastability in the sequential element, or it may transition after the positive edge such that the sequential element captures incorrect state data. Razor error detection is provided augmenting each timing critical sequential element with a transition detector. The transition detector flags any transition on the data input of the sequential element in the setup time window and during the positive phase of the clock as shown in the timing diagram of FIG. 8 of the accompanying drawings.

SUMMARY OF THE INVENTION

Viewed from one aspect the present invention provides a method of detecting single event upset errors within an integrated circuit, said method comprising:

sampling an input signal;

storing said input signal as sampled as a stored signal within a sequential storage element;

detecting as an error a transition of said stored signal stored by said sequential storage element occurring at a time outside a valid transition period.

The present technique recognises that a single event upset error can be detected at a circuit level using techniques similar to the above described Razor techniques. In particular, a sequential storage element for sampling an input signal and then storing that input signal as a stored signal will have a relatively short window of time in which it will be expected that a valid transition within the stored signal can occur. Transitions in the stored signal outside of this valid transition period can be detected as errors and single event upset errors have a high probability of manifesting themselves in this way.

The technique is particularly effective when the sequential storage element samples the input signal for a sampling period which is longer than the valid transition period since changes in the stored signal resulting from single event upsets are then more likely to be detected. Accordingly, it may be that the sampling period is longer than the valid transition period and that the valid transition period is within the sampling period.

The sequential storage element will typically be provided with an input signal generated by a logic circuitry. Particle strikes within this logic circuitry can give rise to pulses in the input signal, which in turn can get captured by the sequential element leading to an erroneous state flip.

When the sampling period is comparatively long the evaluation delay of the logic circuitry should be such that a next input signal which is evaluated by that logic circuitry will not be presented at the input to the sequential storage element before the sampling period for the preceding input signal plus any hold period has finished. If this is not the case, then the next input signal can effectively "race" the previous input signal and be inappropriately captured resulting in a transition which would be incorrectly detected as an error. When the sequential storage element is controlled by a clock signal, the first phase of this clock signal can be used to control the sequential storage element to sample the input signal and the second phase to store the stored signal (e.g. during the first phase the sequential storage element is transparent and in the second phase the sequential storage element is opaque).

The detection of a transition in the stored signal outside of the valid transition period can be performed by transition detector circuitry. This transition detector circuitry may be disabled during the valid transition period such that a valid transition is not inappropriately detected (i.e a disabling period greater than a valid transition period). The disabling period can be triggered from a change in the clock signal value, which corresponds to the start of the sampling by the sequential storage element, and accordingly the point in time at which valid transitions should occur.

The detector used to detect single event upset errors can also be combined with Razor-like detection of timing errors within integrated circuits. Thus, circuit elements provided for one of these uses may be adapted also to function for the other of these uses with relatively little additional overhead.

Viewed from another aspect the present invention provides an integrated circuit comprising:

a sequential storage element having an input receiving a input signal;

control circuitry coupled to said sequential storage element to control said sequential storage element to sample and store said input signal as a stored signal; and a single event upset detector comprising a transition detector coupled to said sequential storage element and responsive to a transition of said stored signal stored by said sequential storage element occurring at a time outside a valid transition period to detect an error.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 9($a$) and ($b$) are block diagrams of Prior Art writing to and reading from ECC memory.

DESCRIPTION OF THE PREFERRED EMBODIMENTS

Figure 1:
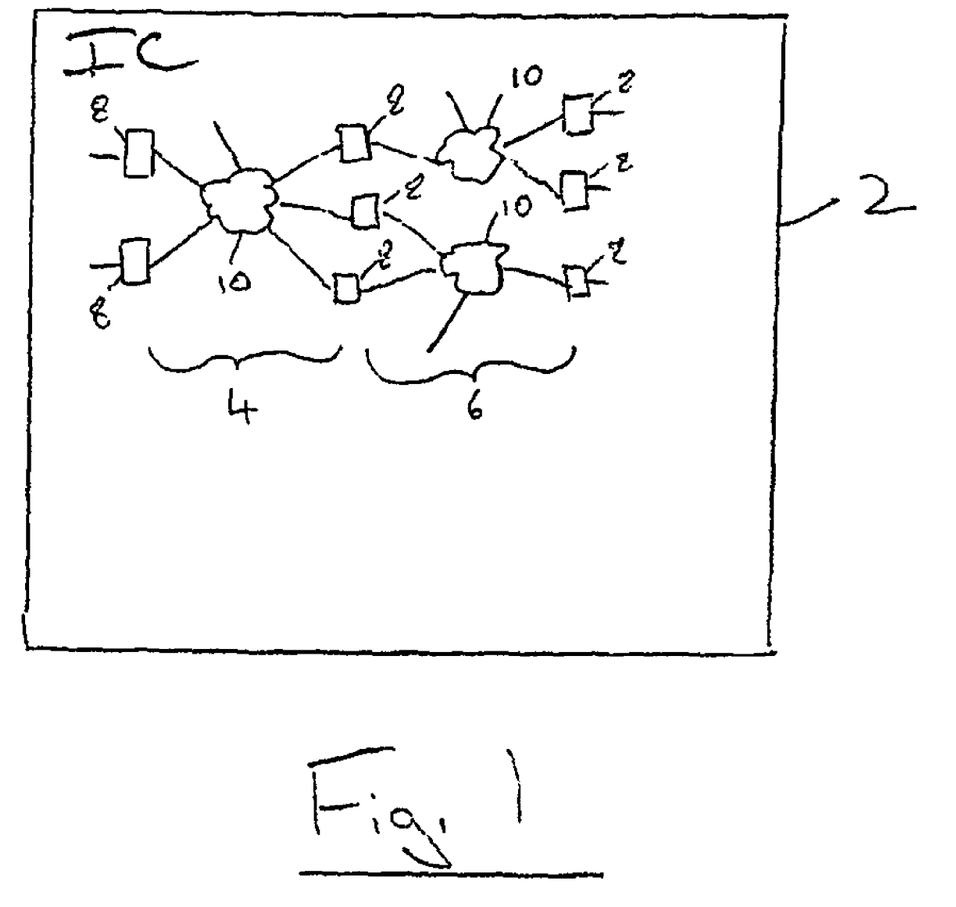
FIG. 1 schematically illustrates an integrated circuit incorporating sequential storage elements, combinatorial logic and a pipelined architecture.

FIG. 1 shows an integrated circuit 2 including pipeline stages 4, 6 extending between sequential edge-triggered storage elements 8 which may be in the form of flip-flops. Between the sequential storage elements 8 are respective instances of logic circuitry 10, which serve to receive signals from one or more preceding stages and generate signals to be passed to one or more succeeding stages. The period of time between the capture of signal values by the sequential storage elements 8 for successive clock periods is the time that is available for the logic circuitry 10 to evaluate its inputs so as to generate its outputs. A timing error will occur if the logic circuitry 10 within a particular processing stage at any time takes too long to evaluate its inputs to generate stable outputs and accordingly generates a transition in one of its outputs after that output has already been sampled by the next sequential storage element. In order to avoid this type of error, it is normal in conventional integrated circuit design to increase the clock period such that such timing errors will not occur even in worst-case situations. The Razor techniques address this performance-reducing problem by detecting and recovering from such errors.

Figure 2:
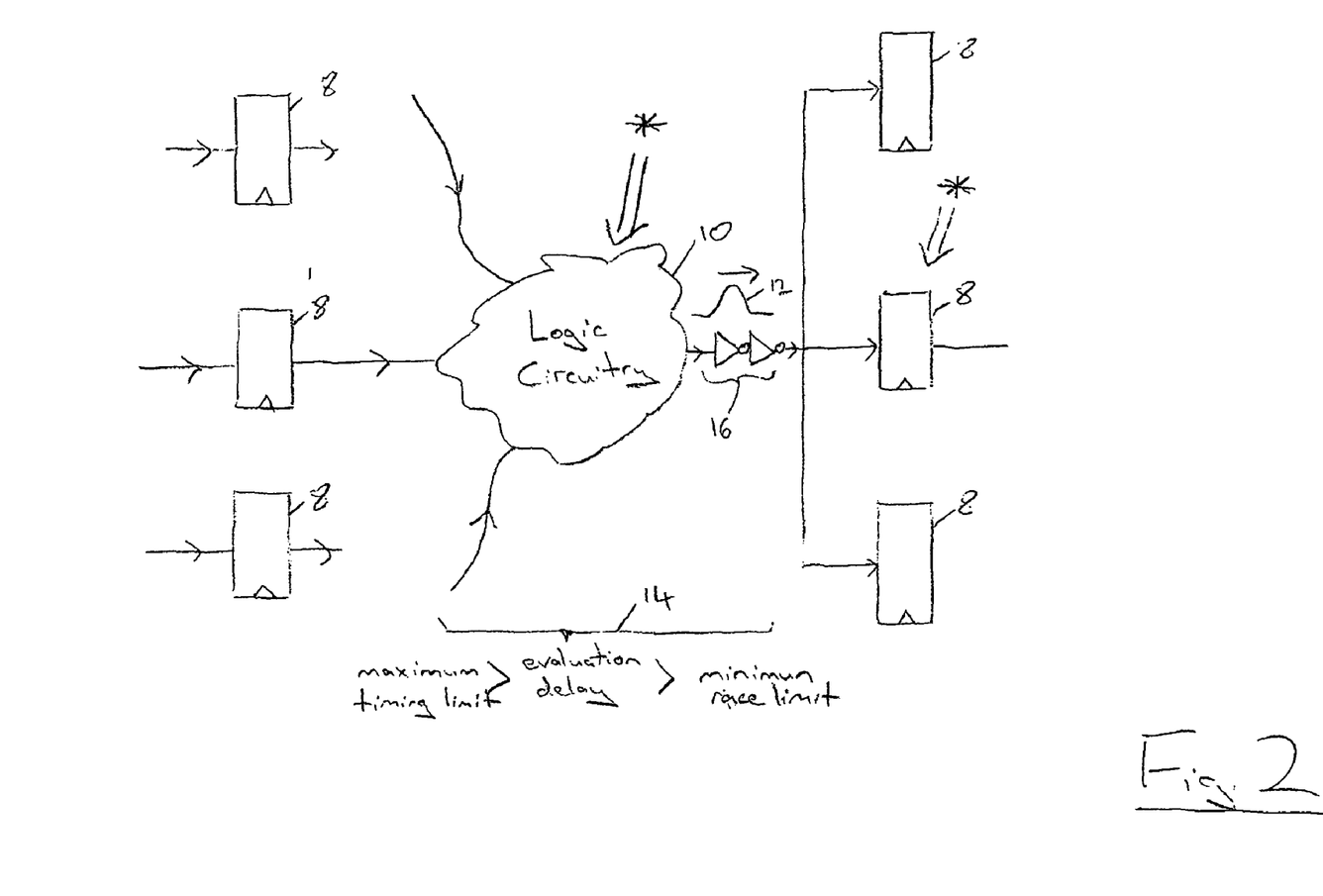
FIG. 2 schematically illustrates a processing stage within such an integrated circuit.

FIG. 2 schematically illustrates a portion of the integrated circuit 2 in more detail. As shown, the logic circuitry 10 or one of the sequential storage elements 8 may be subject to a particle strike as schematically illustrated by the "*". When such a particle strike occurs within the logic circuitry 10, it can generate an unwanted pulse 12 on the output of that logic circuitry 10 which is supplied as an input to several later sequential storage elements 8. Also illustrated in FIG. 2 is a particle strike upon a sequential storage element, 8, itself. In this case the particle strike can give rise to a change in the stored value being stored by that sequential storage element 8.

The logic circuitry 10 has associated with it an evaluation delay 14 which is the time taken for the logic circuitry 10 to respond to its inputs so as to generate stable outputs. This evaluation delay should be less than the maximum timing limit imposed by the clocking of the sequential storage elements 8. Thus, the clock period can be reduced below the maximum timing limit by use of the Razor techniques whereby speculative execution in subsequent processing stages is permitted in combination with appropriate timing error detection mechanisms and error recovery mechanisms. Another limit upon the evaluation delay 14 is a "minimum race limit", which corresponds to the minimum time the logic circuit 10 should take to evaluate its inputs to generate its outputs such that a next input signal value to a sequential storage element 8 will not catch up with the preceding input signal value and be latched within the same sampling window by that sequential storage element 8. In order to assist in avoiding violating such minimum race limit timing, the logic circuitry 10 can include delay elements 16 introduced to lengthen the evaluation delay period.

Figure 3:
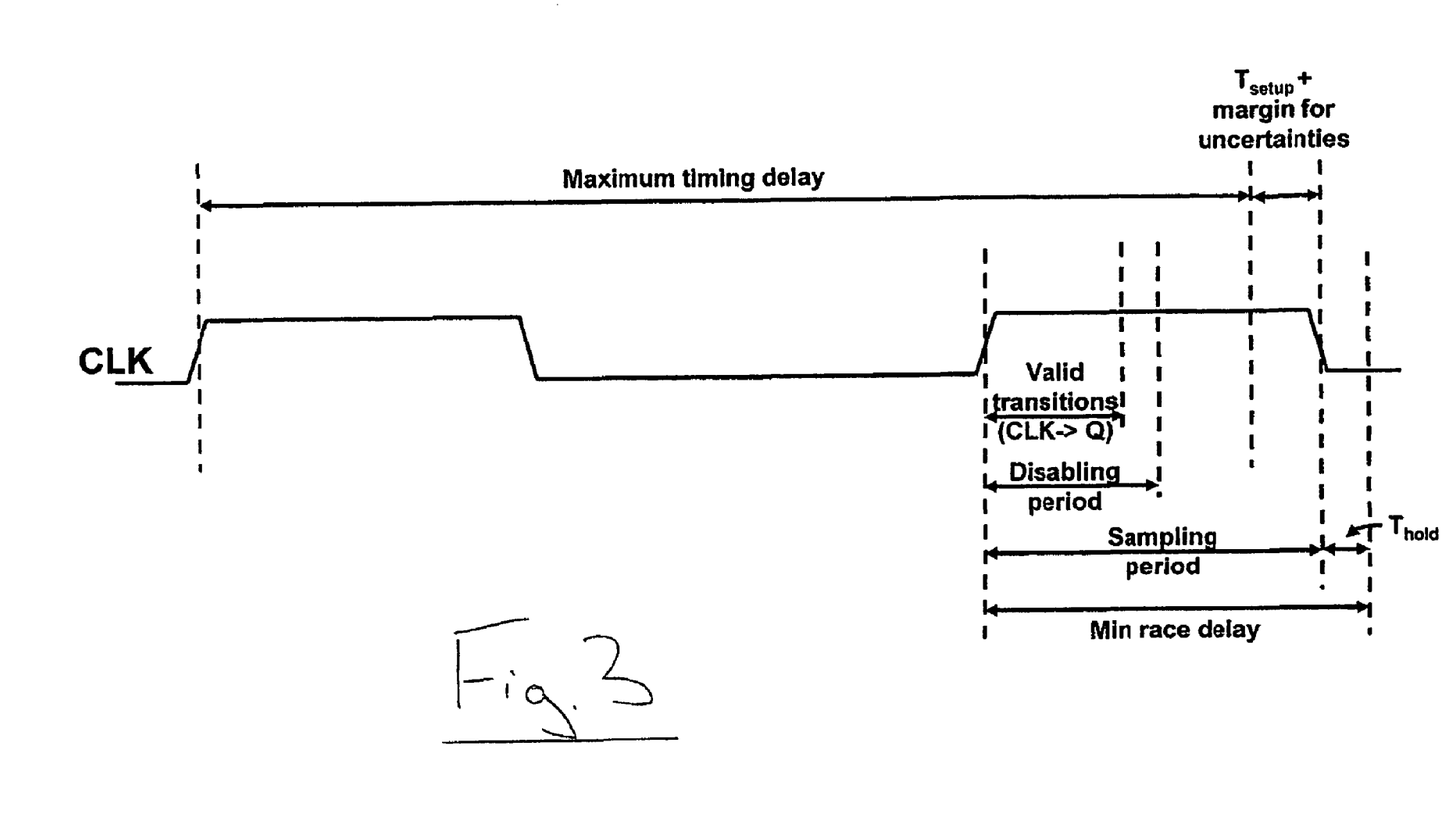
FIG. 3 is a clock timing diagram illustrating various periods associated with a clock controlling sequential storage elements.

The above described maximum timing delay and minimum race limit are illustrated in FIG. 3, which shows the clock signal being used to clock the sequential storage elements 8. It will be noted that as shown in FIG. 3, and discussed above, the maximum timing delay can extend for greater than a clock period, and in some of the previously described Razor-like techniques can extend beyond one clock period by the sampling period of the next clock period minus any set-up delay and a margin for uncertainties associated with the sequential storage element 8. The sampling period of the sequential storage element 8 is shown as extending for the entirety of one of the clock phases. There is a required hold period following the falling edge of the clock. Accordingly, the minimum race delay is the sampling period plus the hold period, such that a next signal will not catch up with a preceding signal within the sampling window for that preceding signal.

In the context of the maximum delay constraint, it is desirable to ensure that even if there is a critical path failure at the positive edge (in the FIG. 3 example), data will settle down to its correct value before the negative edge of that clock. Otherwise data will change state after the sampling window and no error will be flagged even though the sequential storage element 8 will have captured incorrect data due to the timing error. Thus, with conventional worst-case design techniques, it is desirable to ensure that the propagation delay through the logic circuitry 10 does not exceed the clock cycle and the duration of the positive phase of the next clock cycle.

In the context of the minimum delay constraint, it is significant that a transition detector evaluating the stored signal looking for timing errors will evaluate during the high phase of the clock and accordingly the minimum delay of the logic circuitry 10 terminating at the sequential storage element 8 having the transition detector should at least be greater than the hold time of that sequential storage element and the positive phase of the clock. If this constraint is not observed, then a newly evaluated signal can race through and cause the transition detector to flag a false error. This minimum delay constraint can be met, if necessary, by insertion of additional delay elements 16 into the path between the sequential storage elements 8. Whilst these delay elements 16 consume additional circuit area and power, this is not sufficient to negate the advantage of these techniques.

Figure 4:
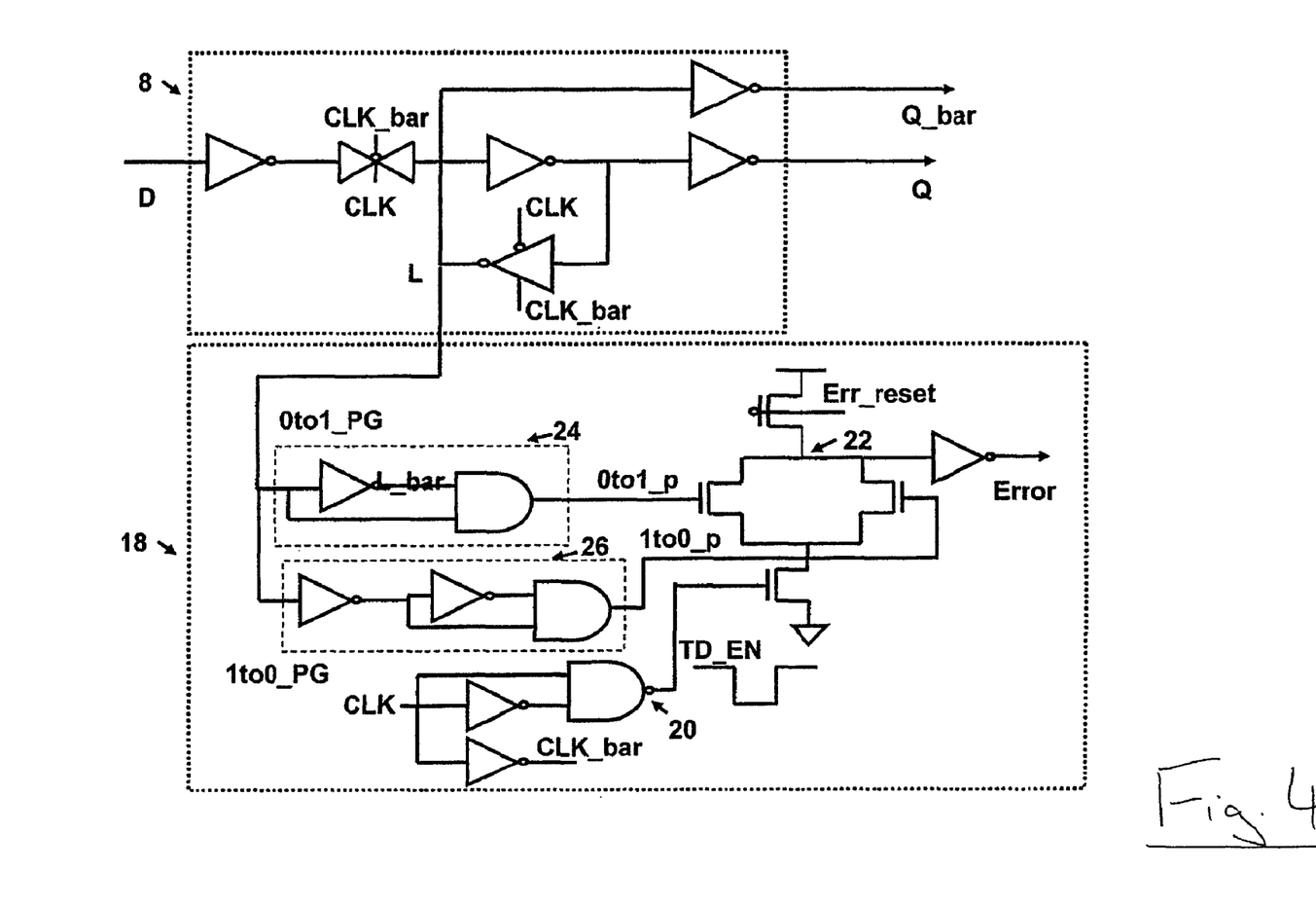
FIG. 4 illustrates a circuit schematic of a sequential storage element and an associated transition detector.
Figure 5:
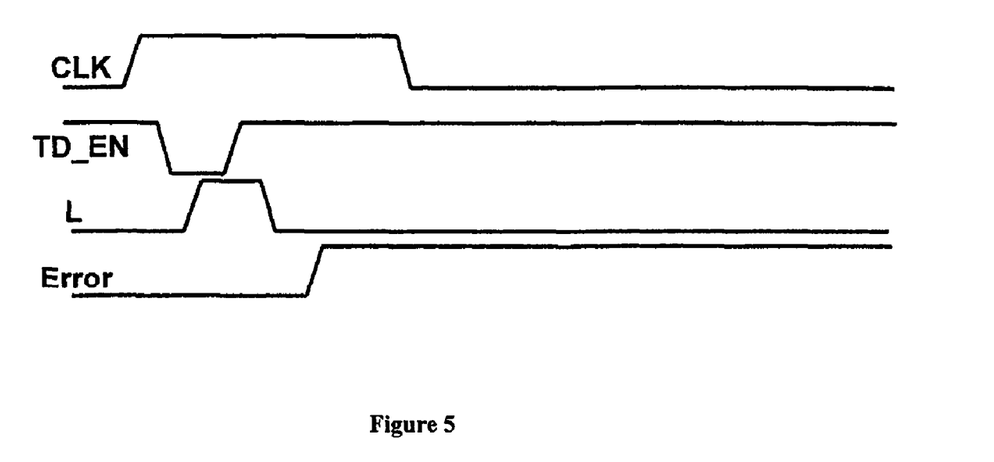
FIG. 5 is a timing diagram illustrating the mechanism for detecting a single event upset error during a disabling phase of the transition detector.

The transition detector combined with a sequential storage element as illustrated in FIG. 4 is able to detect single event upset errors due to particle strikes both upon the logic circuitry 10 as well as the sequential storage elements 8. As previously mentioned, the transition detector employed can also be used to provide timing error protection. Razor-like error recovery can be used both in respect of timing errors and single event upset errors.

The present technique makes use of a transition detector similar to that described in US2005/246613 mentioned above. Single event upset errors caused due to particle strikes cause transient signal pulses to occur on transistor nodes. When the particle strike occurs on a flip-flop's state retention node, it can flip its current state leading to state corruption. In such cases, it causes single bit failures in a clock cycle. However, when particle strikes occur in combinational logic (logic circuitry), then the resultant pulse can propagate through and can get captured at multiple destination flip-flops in its fan-out. Thus, a single strike can cause multiple bit failures at the rising edge of the clock.

The standard technique to deal with such failure modes is through core duplication. The core and its replica are run in lock-step and a comparator circuit flags an error if the outputs of both disagree. However, this technique increases area and power consumption by at least two times. Sometimes, implementations have multiple copies of the core with voting between replicas. The power and area overhead goes up at least linearly with the number of cores.

At least some embodiments of the present technique can provide a low overhead solution for SEU detection and can be used to achieve SEU detection on combinational logic as well as flip-flops by utilizing concepts which are:—
   (a) Transition Detector
   (b) Meeting the Minimum Delay Constraint A particle strike on combinational logic (logic circuitry 10) can cause multiple bit failures if the resulting pulse gets captured by multiple flip-flops (sequential edge-triggered storage elements). When the pulse dies out, it will manifest itself as a transition on the data input after the positive edge of the clock. A transition detector can suitably flag such a case as an error. Hence, according to the present technique, it has been recognised that the transition detector can detect SEU failures due to particle strikes by virtue of transitions occurring outside of a valid transition period. This valid transition period is shown in FIG. 3.

Since the transition detector in this embodiment evaluates until the end of the positive phase of the clock, successful deployment in this example requires satisfying the minimum delay constraint. This means that any combinational logic path terminating in a flip-flop augmented with a transition detector should be at least greater than the positive clock phase. Using suitable clock chopping techniques, it is possible to configure that the duration of the positive clock phase meets this requirement.

The most popular implementation of a flip-flop is the master-slave architecture. The master latch is transparent in the negative phase of the clock and samples state at the rising edge. The slave latch is transparent in the positive phase of the clock and samples at the negative edge. Thus, by feeding the output of the master latch into the slave latch, one can implement a positive edge triggered flip-flop.

However, the following embodiments of the present technique make use of the observation that since data should not be allowed to change state in the positive phase of the clock, one can eliminate the master latch altogether and yet retain the positive-edge triggered property. In other words, by meeting the minimum delay constraint, the slave latch can be forced to behave as a positive-edge triggered flip-flop. In the event of a timing failure, the slave latch, being transparent, should capture the new state of the data. However, such an event will be correctly flagged as a timing error by the transition detector.

The transition detector monitors any transition causing a state flip inside the latch due to a particle strike. Such a state upset could happen by two possible mechanisms:

(i) A Direct Hit on the Latch State Retention Node

It if this strike happens during the transparent phase of the latch, then it will manifest itself as a transient pulse. This is because as soon as the effect of the particle strike dies out, the latch driver should restore the signal back to its former state. If the strike happens during the opaque phase of the latch, then the strike will cause a state flip that will last until the end of the phase.

(ii) A Hit on the Combinational Logic Driving the Flip-Flop

Such a strike causes a transient pulse which can propagate through to the flip-flops. If this strike happens during the transparent phase of the latch, then the transient pulse at the data input causes a similar pulse on the latch node as well. If the strike happens during the opaque phase of the latch, then the pulse should never propagate to the latch node and processor state should not be affected. This does not qualify as an error as it does not cause a state flip.

Thus, a state flip due to a particle strike either on the flip-flop node or on the combinational logic feeding this node causes a transition at the latch node. Hence the transition detector monitors transitions at the latch node. After the positive edge of the clock, the latch undergoes a state change to reflect the state of the data input. During this time period sometimes called the CLK-Q delay of the latch, valid transitions occur at the latch node. In this example, this can be the valid transition period. Hence, the transition detector should be enabled throughout the entire clock cycle except for the duration of time equal to CLK-Q delay of the latch immediately after the positive edge of the clock (a disabling period).

An illustrative circuit schematic showing a sequential storage element 8 and a transition detector 18 is shown in FIG. 4. The standard master-slave flip-flop has been replaced with a positive-phase transparent latch for which a state retention node is monitored by the transition detector 18. The disabling signal to the transition detector 18 is generated out of a pulse generator circuit 20 which outputs a low pulse out of the rising transition of the clock. Thus, the transition detector is enabled throughout the clock cycle except for the duration of the low pulse. The minimum width of the low pulse should be at least equal to the CLK-Q delay of the transparent latch.

If a SEU happens during the period of time that the detector is disabled, due to the transparency of the latch, the true state transition of the latch is delayed in time until the pulse has died out. If the duration of the pulse width is greater than the disabling period of the detector, then the delayed state transition should happen after the detector has been enabled as shown in FIG. 4.

Figure 6:
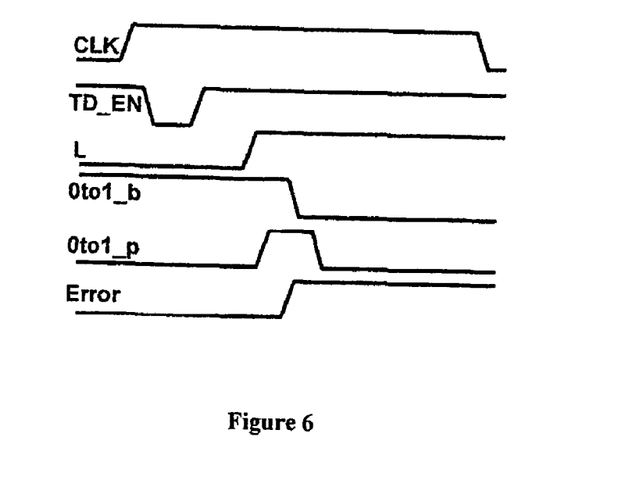
FIGS. 6 and 7 are timing diagrams illustrating operation of the transition detector.
Figure 7:
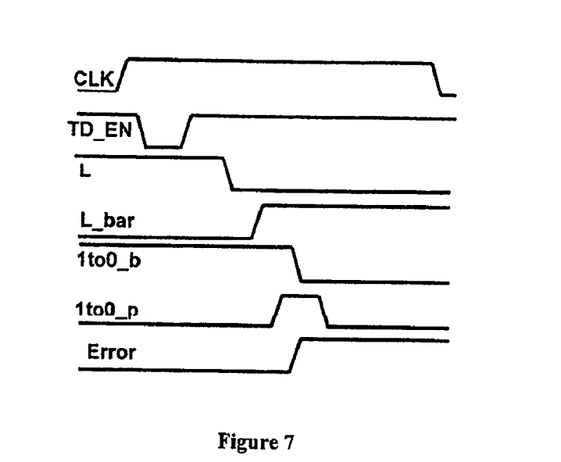

The transition detector 18 operates by generating a pulse of sufficient width such that it can be evaluated by a dynamic node 22, which has been pre-charged to VDD. It uses two pulse generators, one generator 24 for the 0 to 1 transition and the other generator 26 for the 1 to 0 transition. Timing diagrams that illustrate the working of the pulse generators 24, 26 are shown in FIGS. 6 and 7.

Scan Capability

The SEU tolerant latch of FIG. 4 can be made scannable. However, the scan_enable and the scan_in signals (not illustrated) should both meet the minimum delay constraint. If either of these signals changes state during the positive phase of the clock, then the transparent latch will transition leading to an error being flagged during the scan operation. The high phase of the scan clock needs to be constrained such that the minimum delay constraint is not violated.

Additional Issues (a) Metastability: The SEU detecting latch shuts off when the clock goes low. If a SEU pulse propagates to the latch node just when the latch is shutting off, then metastbility can occur in the latch. The voltage of a metastable latch node hovers somewhere close to VDD/2 until it resolved to either VDD or VSS. Metastability should not be problematic if it can be suitably detected and flagged by the transition detector. However, this increases the complexity of the design of the transition detector since it has to respond to mid-rail instead of full-rail transitions. Two ways in which the issue of metastability can be addressed are:

1) Additional transition detector at the data input: The extra transition detector monitors transitions at the data input for the entire positive phase and a small duration of time after the latch shuts off. This is because any transition on the data input around the negative edge of the clock is likely to cause metastability. However, this implementation will increase the power and area overhead of the latch.

2) Monitor transitions at downstream nodes instead of the latching node: In this implementation, the latching node is decoupled from the output driver by an additional inverter. The detector monitors transitions at the output of the extra inverter.

b) CLK-Q needs to be de-rated: The transition detector 18 is disabled for a small period of time equal to the CLK-Q delay of the latch. Hence, a pulse that occurs exclusively in this window may escape detection.

c) Particle strikes at the transition detector nodes exactly when timing occurs: When used in conjunction with timing speculation, the latch is unlikely to be able to detect timing errors when a SEU strikes happens on the transition detector exactly when the timing occurs.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of detecting effects of single event upset errors within an integrated circuit, said method comprising:
sampling an input signal;
storing said input signal as sampled as a stored signal consisting of a single stored signal value within a sequential storage element;
detecting from only said single stored signal value a transition of said single stored signal value stored by said sequential storage element occurring at a time outside a valid transition period as indicating an error.

2. A method as claimed in claim 1, wherein said step of detecting detects a particle strike effect within said sequential storage element resulting in a transition of said stored signal stored by said sequential storage element outside said valid transition period.

3. A method as claimed in claim 1, wherein said step of detecting detects timing errors within said integrated circuit.

4. A method as claimed in claim 1, wherein said step of detecting is performed by transition detector circuitry.

5. A method as claimed in claim 4, comprising disabling said transition detector circuitry for a disabling period.

6. A method as claimed in claim 5, comprising:
controlling said sequential storage element with a clock signal having a first clock signal value during a first clock phase and a second clock signal value during a second clock phase; wherein
said clock signal changing from said second clock signal value to said first clock signal value triggers a start of said disabling period.

7. A method as claimed in claim 5, comprising
controlling said sequential storage element with a clock signal having a first clock signal value during a first clock phase and a second clock signal value during a second clock phase; wherein
said sequential storage element is responsive to said clock signal having said first clock signal value to sample said signal and said disabling period expires after said sequential storage element has sampled said input signal following said clock signal changing from said second clock signal value to said first clock signal value.

8. A method as claimed in claim 1, wherein said sequential storage element samples said input signal for a sampling period, said sampling period being longer than said valid transition period.

9. A method as claimed in claim 8, wherein said valid transition period is within said sampling period.

10. A method as claimed in claim 8, comprising:
controlling said sequential storage element with a clock signal having a first clock signal value during a first clock phase and a second clock signal value during a second clock phase.

11. A method as claimed in claim 10, wherein said sequential storage element is responsive to said clock signal having said first clock signal value to sample said signal.

12. A method as claimed in claim 11, wherein said sequential storage element is responsive to said clock signal having said second clock signal value to store said stored signal resulting from said sampling during said first clock phase.

13. A method as claimed in claim 8, comprising:
generating said input signal with logic circuitry; and
supplying said input signal to said sequential storage element.

14. A method as claimed in claim 13, wherein said step of detecting detects a particle strike effect within said logic circuitry resulting in a transition of said stored signal stored by said sequential storage element within said sampling period and outside said valid transition.

15. A method as claimed in claim 13, wherein after generating said input signal said logic circuitry generates a next input signal supplied to said sequential storage element after an evaluation delay period, said evaluation delay period expiring no earlier than expiry of said sampling period for said input signal plus a hold time for said sequential storage element.

16. A method as claimed in claim 15, comprising delaying said next input signal with at least one delay element within said logic circuitry such that said next input signal is supplied to said sequential storage element no earlier than expiry of said sampling period for said input signal.

17. An integrated circuit comprising:
a sequential storage element having an input receiving a input signal;
control circuitry coupled to said sequential storage element to control said sequential storage element to sample and store said input signal as a stored signal consisting of a single stored signal value; and
a single event upset effect detector comprising a transition detector coupled to said sequential storage element and responsive to only said single stored signal value to detect a transition of said single stored signal value stored by said sequential storage element occurring at a time outside a valid transition period as indicating an error.

18. An integrated circuit as claimed in claim 17, wherein said single event upset effect detector detects a particle strike effect within said sequential storage element resulting in a transition of said stored signal stored by said sequential storage element outside said valid transition period.

19. An integrated circuit as claimed in claim 17, wherein said transition detector detects timing errors within said integrated circuit.

20. An integrated circuit as claimed in claim 17, wherein said control circuitry disables said transition detector circuitry for a disabling period.

21. An integrated circuit as claimed in claim 20, wherein said control circuitry controls said sequential storage element with a clock signal having a first clock signal value during a first clock phase and a second clock signal value during a second clock phase and said clock signal changing from said second clock signal value to said first clock signal value triggers a start of said disabling period.

22. An integrated circuit as claimed in claim 20, wherein said control circuitry controls said sequential storage element with a clock signal having a first clock signal value during a first clock phase and a second clock signal value during a second clock phase and said sequential storage element is responsive to said clock signal having said first clock signal value to sample said input signal and said disabling period expires after said sequential storage element has sampled said input signal following said clock signal changing from said second clock signal value to said first clock signal value.

23. An integrated circuit as claimed in claim 17, wherein said control circuitry is formed so as to control said sequential storage element to sample said input signal for a sampling period, said sampling period being longer than said valid transition period.

24. An integrated circuit as claimed in claim 23, wherein said valid transition period is within said sampling period.

25. An integrated circuit as claimed in claim 23, wherein said control circuitry controls said sequential storage element with a clock signal having a first clock signal value during a first clock phase and a second clock signal value during a second clock phase.

26. An integrated circuit as claimed in claim 25, wherein said sequential storage element is responsive to said clock signal having said first clock signal value to sample said input signal.

27. An integrated circuit as claimed in claim 26, wherein said sequential storage element is responsive to said clock signal having said second clock signal value to store said signal value resulting from said sampling during said first clock phase.

28. An integrated circuit as claimed in claim 23, comprising:
logic circuitry, said logic circuitry generating said input signal for supply to said sequential storage element.

29. An integrated circuit as claimed in claim 28, wherein said single event upset effect detector detects a particle strike effect within said logic circuitry resulting in a transition of said stored signal stored by said sequential storage element within said sampling period and outside said valid transition.

30. An integrated circuit as claimed in claim 28, wherein after generating said signal said logic circuitry generates a next input signal supplied to said sequential storage element after an evaluation delay period, said evaluation delay period expiring no earlier than expiry of said sampling period for said input signal plus a hold time for said sequential storage element.

31. An integrated circuit as claimed in claim 30, comprising at least one delay element within said logic circuitry, said at least one delay element delaying said next input signal such that said next input signal is supplied to said sequential storage element no earlier than expiry of said sampling period for said input signal.

* * * * *